(12) United States Patent
Liu

(10) Patent No.: US 11,007,394 B2
(45) Date of Patent: May 18, 2021

(54) METHOD OF MAKING A WEIGHT-TYPE EXERCISE DEVICE AND A DUMBBELL AND BELL PIECE PRODUCED BY THE METHOD

(71) Applicant: OHFG TECHNOLOGIES(SHANGHAI) CO., LTD, Shanghai (CN)

(72) Inventor: Ping Liu, Shanghai (CN)

( * ) Notice: Subject to any disclaimer, the term of this patent is extended or adjusted under 35 U.S.C. 154(b) by 41 days.

(21) Appl. No.: 16/440,086

(22) Filed: Jun. 13, 2019

(65) Prior Publication Data
US 2020/0197740 A1   Jun. 25, 2020

(30) Foreign Application Priority Data
Dec. 21, 2018 (CN) .......................... 201811577905.X

(51) Int. Cl.
| A63B 21/06 | (2006.01) |
| A63B 21/00 | (2006.01) |
| A63B 21/072 | (2006.01) |
| B23P 15/00 | (2006.01) |

(52) U.S. Cl.
CPC ...... *A63B 21/0603* (2013.01); *A63B 21/0726* (2013.01); *A63B 21/4035* (2015.10); *B23P 15/00* (2013.01); *Y10T 29/49993* (2015.01)

(58) Field of Classification Search
CPC ............ A63B 21/0726; A63B 21/0603; A63B 21/4035; B23P 15/00; Y10T 29/4998; Y10T 29/49993
USPC ................................................. 482/106, 108
See application file for complete search history.

(56) References Cited

U.S. PATENT DOCUMENTS

| 3,171,652 | A | * | 3/1965 | Newman | A63B 21/0724 482/106 |
| 3,463,486 | A | * | 8/1969 | James, Jr. | A63B 21/0728 482/106 |
| 3,482,834 | A | * | 12/1969 | James, Jr. | A63B 21/0604 482/108 |
| 4,103,887 | A | * | 8/1978 | Shoofler | A63B 21/0602 482/106 |
| 4,538,806 | A | * | 9/1985 | Wilkerson | A63B 21/0726 482/108 |
| 5,056,778 | A | * | 10/1991 | Hull | A63B 21/075 482/105 |
| 6,224,520 | B1 | * | 5/2001 | Hsu | A63B 21/0603 482/107 |
| 2005/0065001 | A1 | * | 3/2005 | Su | A63B 21/075 482/106 |

(Continued)

*Primary Examiner* — Jason L Vaughan
(74) *Attorney, Agent, or Firm* — W&K IP

(57) ABSTRACT

The invention discloses a method of making a weight-type exercise device, comprising the steps of: (1) prefabricating an outer shell half and an inner shell half; (2) forming a slurry inlet port in the outer shell half; (3) mating and sealing the outer shell half with the inner shell half to form a unitary weight shell; (4) pouring a mixed slurry into the unitary weight shell through the slurry inlet port; (5) subjecting the unitary weight shell to a shaking treatment; (6) sealing up the slurry inlet port with a steel plate; and (7) finishing the surface of the unitary weight shell by painting and baking. Compared with traditional one-piece cast iron counterparts, much lower cost can be achieved with a simpler process.

7 Claims, 4 Drawing Sheets

(56) References Cited

U.S. PATENT DOCUMENTS

2005/0065002 A1\* 3/2005 Su ..................... A63B 21/0726
  482/106
2005/0096195 A1\* 5/2005 Morrissette ........ A63B 21/0601
  482/93

\* cited by examiner

METHOD OF MAKING A WEIGHT-TYPE EXERCISE DEVICE AND A DUMBBELL AND BELL PIECE PRODUCED BY THE METHOD

CROSS-REFERENCE TO RELATED APPLICATIONS

This application claims priority to Chinese Patent Application No. 201811577905.X with a filing date of Dec. 21, 2018. The content of the aforementioned application, including any intervening amendments thereto, are incorporated herein by reference.

FIELD OF THE INVENTION

The invention relates to the technical field of fitness equipment, in particular a method of making a weight-type exercise device and a dumbbell and bell piece produced by the method.

BACKGROUND OF THE INVENTION

Dumbbell is a simple equipment for muscle strength training. It is used for muscle strength training and muscle compound movement training, Patients with low muscle strength due to paralysis, pain and long-term inactivity can use the weight of dumbbells to exercise actively against resistance and train muscle strength.

But the main material of the traditional dumbbell is cast iron. The handle and dumbbell ball are cast from pig iron. They consume a lot of materials, have high production cost and are not conducive to environmental protection. In the long-term use, the dumbbell rusts seriously, which greatly reduces its aesthetics and practicability.

SUMMARY OF THE INVENTION

The invention aims to provide a method of making a weight-type exercise device with simple technology, environmental protection of materials, neat product specifications and beautiful appearance, and a dumbbell and bell piece produced by the method.

The invention provides the following technical proposals to realize the purpose:

A method of making a weight-type exercise device, comprising the steps of:

(1) prefabricating an Outer shell half and an inner shell half;

(2) forming a slurry inlet port in the outer shell half;

(3) mating and sealing the outer shell half with the inner shell half to form a unitary weight shell;

(4) pouring a mixed slurry into the unitary weight shell through the slurry inlet port;

(5) subjecting the unitary weight shell to a shaking treatment;

(6) sealing up the slurry inlet port with a steel plate; and (7) finishing the surface of the unitary weight shell by painting and baking.

As a further proposal of the invention, the outer shell half is an outer half of a dumbbell shell or an upper half of a weight plate shell, and the inner shell half is an inner half of the dumbbell shell or a lower half of the weight plate shell.

As a further proposal of the invention, the outer shell half and the inner shell half are both fabricated using a deep drawing process.

As a further proposal of the invention, the outer shell half is mated and sealed with the inner shell half by welding.

As a further proposal of the invention, the mixed slurry comprises a mixture of iron sand and cement, a mixture of cement and copper powder, a mixture of iron slag and cement, a mixture of iron slag and copper powder, or a mixed slurry of iron sand, sand, mud and wood dust.

As a further proposal of the invention, the shaking treatment to which the unitary weight shell is subjected is carried out by a shaking machine.

As a further proposal of the invention, the slurry inlet port is sealed up with the steel plate by welding.

A dumbbell made by the method, comprising outer shell halves, inner shell halves and a handle, the outer shell halves mated and sealed with the inner shell halves to form dumbbell shells, the outer shell halves each provided with a slurry inlet port, the slurry inlet port covered with a steel plate, the inner shell halves defining through bores, the handle inserted through the through bores, the dumbbell shells disposed on both ends of the handle, the dumbbell shells each internally filled with a mixed slurry.

As a further proposal of the invention, the dumbbell shells and the handle are all hollow.

A weight plate made by the method, comprising an upper shell half and a lower shell half, the upper shell half mated and sealed with the lower shell half to form a weight plate shell, the upper shell half provided with a slurry inlet port, the slurry inlet port covered with a steel plate, the weight plate shell internally filled with a mixed slurry.

Compared with the prior art, the present invention offers the advantages as follows: both the dumbbell and the weight plate of the present invention are made up of two halves mated and sealed together, which are fabricated by a deep drawing process and are thus strong and tough. Compared with traditional one-piece cast iron counterparts, much lower cost can be achieved with a simpler process. Through filling the hollow dumbbell shells and weight plate shell with the mixed slurry, weight adjustability can be realized while significantly enhancing the utilization of the waste materials, improving environmental friendliness, adhering to the concept of green and environmental technologies, reducing pollution and greatly lowering the cost compared to the traditional one-piece cast iron counterparts.

DETAILED DESCRIPTION

In order for objects, features and advantages of the present invention to be more apparent, the subject matter of the invention will be further described below.

The present invention proposes a method of making a weight-type exercise device, comprising the steps of:

(1) prefabricating an outer shell half and an inner shell half;

(2) forming a slurry inlet port in the outer shell half;

(3) mating and sealing the outer shell half with the inner shell half to form a unitary weight shell;

(4) pouring a mixed slurry into the unitary weight shell through the slurry inlet port;

(5) subjecting the unitary weight shell to a shaking treatment;

(6) sealing up the slurry inlet port with a steel plate; and (7) finishing the surface of the unitary weight shell by painting and baking.

In this embodiment, the outer shell half is an outer half of a dumbbell shell or an upper half of a weight plate shell, while the inner shell half is an inner half of the dumbbell shell or a lower half of the weight plate shell.

In this embodiment, the outer shell half and the inner shell half are both fabricated using a deep drawing process and are thus strong and tough. Compared with traditional one-piece cast iron counterparts, lower cost can be achieved with a simpler process.

In this embodiment, the outer shell half is mated and sealed with the inner shell half by welding.

In this embodiment, the mixed slurry includes a mixture of iron sand and cement, a mixture of cement and copper powder, a mixture of iron slag, and cement, a mixture of iron slag and copper powder, or a mixed slurry of iron sand, sand, mud and wood dust. This significantly enhances the utilization of the waste materials, improves environmental friendliness, adheres to the concept of green and environmental technologies, reduces pollution and greatly lowers the cost compared to the traditional one-piece cast iron counterparts.

In this embodiment, the shaking treatment to which the unitary weight shell is subjected is carried out by a shaking machine so that air within the shell can be discharged, making the mixed slurry denser.

In this embodiment, the shiny inlet port is sealed up with the steel plate by welding.

Figure 1:
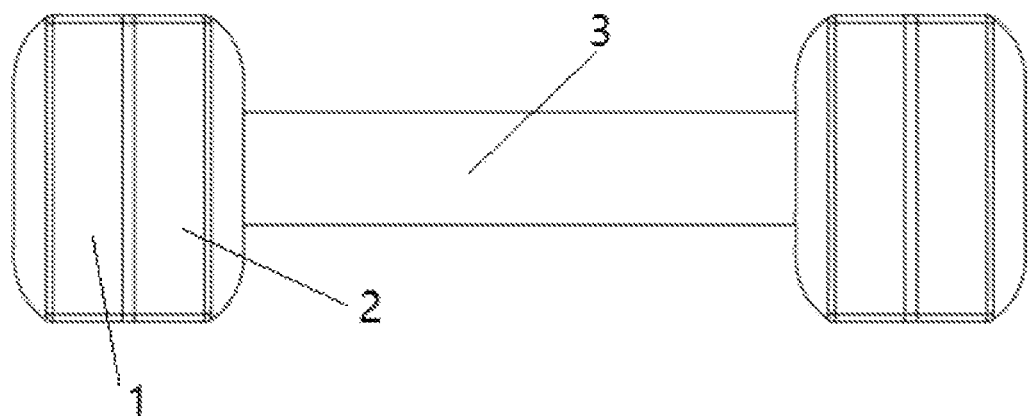
FIG. 1 depicts a schematic overview of a dumbbell according to an embodiment of the present invention.
Figure 2:
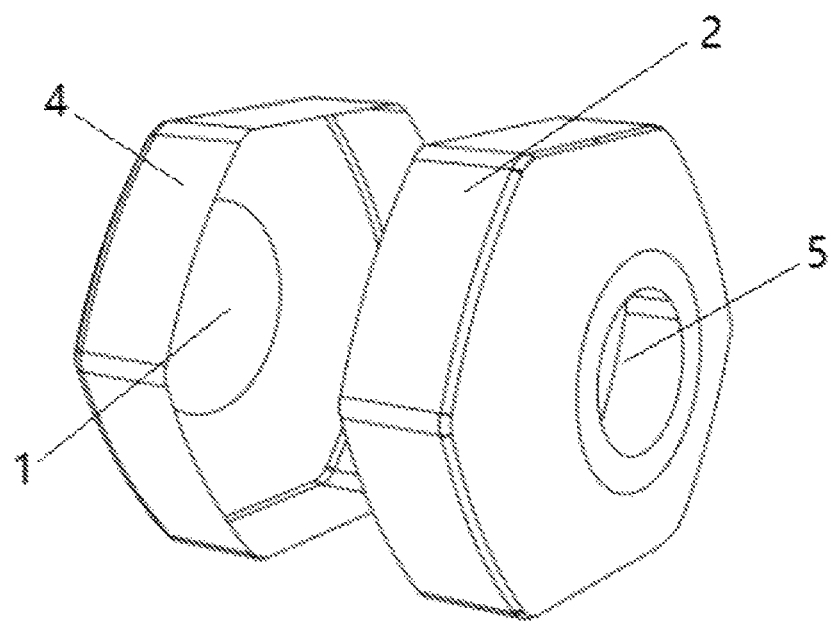
FIG. 2 depicts a schematic overview of a dumbbell shell according to an embodiment of the present invention.

As shown in FIGS. 1 and 2, the present invention also proposes a dumbbell made by the method as defined above, including outer, shell halves 1, inner shell halves 2 and a handle 3, the outer shell halves 1 mated and sealed with the inner shell halves 2 to form dumbbell shells, the outer shell halves 1 each provided with a slurry inlet port 4, the slurry inlet port 4 covered with a steel plate, the inner shell halves 2 defining through bores 5, the handle 3 inserted through the through bores 5, the dumbbell shells disposed on both ends of the handle 3, the dumbbell shells each internally filled with a mixed slurry.

In this embodiment, the dumbbell shells and the handle 3 are all hollow. The mixed slurry may be poured through the slurry inlet ports until the interiors of the dumbbell shells are fully occupied by the mixed slurry.

Figure 3:
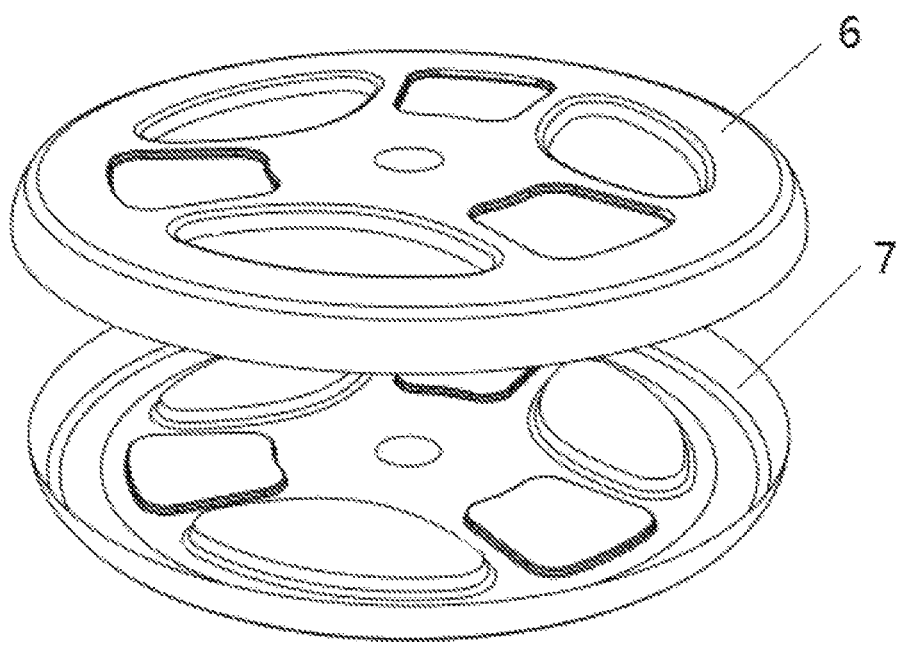
FIG. 3 is an exploded view of a weight plate shell according to an embodiment of the present invention.
Figure 4:
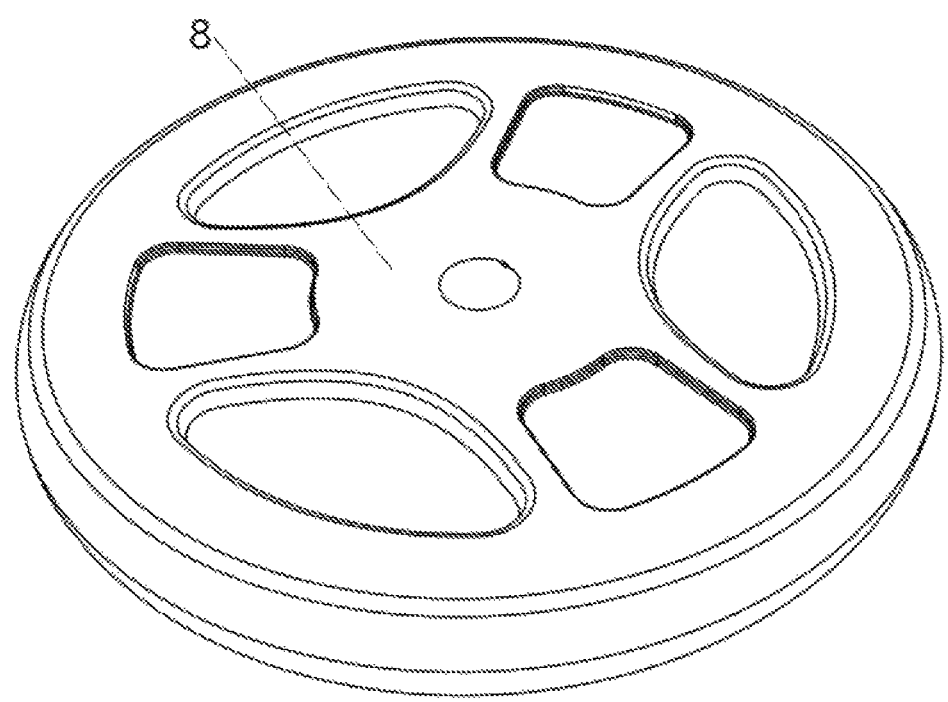
FIG. 4 depicts a schematic overview of a weight plate shell according to an embodiment of the present invention.

As shown in FIGS. 3 and 4, the present invention also proposes a weight plate made by the method as defined above, including an upper shell half 6 and a lower shell half 7, the upper shell half 6 mated and sealed with the lower shell half 7 to, form a weight plate shell 8, the upper shell half 6 provided with a slurry inlet port, the slurry inlet port covered with a steel plate, the weight plate shell 8 internally filled with a mixed slurry.

Presented above are merely a few preferred embodiments of the present invention, which do not limit the invention in any sense. Changes in any form such as equivalent substitutions or modifications made by those of ordinary skill in the art to the subject matter and teachings disclosed herein without departing from the scope of the subject matter of the invention all fall within the scope of protection of the invention without departure therefrom.

I claim:

1. A method of making a weight-type exercise device, comprising the steps of:
    (1) prefabricating an outer shell half and an inner shell half;
    (2) forming a slurry inlet port in the outer shell half;
    (3) mating and sealing the outer shell half with the inner shell half to form a unitary weight shell;
    (4) pouring a mixed slurry into the unitary weight shell through the slurry inlet port;
    (5) subjecting the unitary weight shell to a shaking treatment;
    (6) sealing up the slurry inlet port with a steel plate; and
    (7) finishing the surface of the unitary weight shell by painting and baking.

2. The method of claim 1, wherein the outer shell half is an outer half of a dumbbell shell or an upper half of a weight plate shell, and wherein the inner shell half is an inner half of the dumbbell shell or a lower half of the weight plate shell.

3. The method of claim 1, wherein the outer shell half and the inner shell half are both fabricated using a deep drawing process.

4. The method of claim 1, wherein the outer shell half is mated and sealed with the inner shell half by welding.

5. The method of claim 1, wherein the mixed slurry comprises a mixture of iron sand and cement, a mixture of cement and copper powder, a mixture of iron slag and cement, a mixture of iron slag and copper powder, or a mixed slurry of iron sand, sand, mud and wood dust.

6. The method of claim 1, wherein the shaking treatment to which the unitary weight shell is subjected is carried out by a shaking machine.

7. The method of claim 1, wherein the slurry inlet port is sealed up with the steel plate by welding.

\* \* \* \* \*